(12) United States Patent
Nakano

(10) Patent No.: US 6,639,941 B1
(45) Date of Patent: Oct. 28, 2003

(54) RADIO-SIGNAL TRANSCEIVER

(75) Inventor: Motoo Nakano, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/454,410

(22) Filed: Dec. 3, 1999

(30) Foreign Application Priority Data

Dec. 4, 1998 (JP) .......................................... 10-345700

(51) Int. Cl.[7] .............................. H04B 1/38; H04L 5/16
(52) U.S. Cl. ...................... 375/219; 375/220; 375/340; 455/435; 455/466
(58) Field of Search .............................. 375/219, 220, 375/222, 316, 340, 377; 455/458, 432, 433, 435, 466; 340/7.2, 7.21, 7.22, 7.23, 7.41, 7.43, 7.44, 7.51, 7.52, 7.55

(56) References Cited

U.S. PATENT DOCUMENTS

| 5,258,751 A | * | 11/1993 | DeLuca et al. | ............ | 340/7.52 |
| 5,892,456 A | * | 4/1999 | Ishida | ........................ | 340/7.52 |
| 5,926,109 A | * | 7/1999 | Narusawa | ................... | 340/7.52 |
| 6,032,022 A | * | 2/2000 | Katada | ........................ | 340/7.41 |
| 6,078,820 A | * | 6/2000 | Wells et al. | ................. | 455/466 |
| 6,125,281 A | * | 9/2000 | Wells et al. | ................. | 455/466 |
| 6,400,256 B2 | * | 6/2002 | Amma | ........................ | 340/7.46 |

FOREIGN PATENT DOCUMENTS

| JP | 5-63630 | 3/1993 |
| JP | 7-23439 | 1/1995 |
| JP | 8-186635 | 7/1996 |
| JP | 8-307919 | 11/1996 |
| JP | 9-35395 | 3/1997 |
| JP | 9-64761 | 3/1997 |
| JP | 9-247725 | 9/1997 |
| JP | 9-298604 | 11/1997 |
| JP | 10-98755 | 4/1998 |
| JP | 10-191414 | 7/1998 |

* cited by examiner

Primary Examiner—Phoung Phu
(74) Attorney, Agent, or Firm—Scully, Scott, Murphy & Presser

(57) ABSTRACT

There is provided a radio-signal transceiver including an antenna, a radio-signal receiver receiving a message having been received through the antenna, addressed to a calling number of the radio-signal transmitter, a main controller controlling an operation of the radio-signal receiver, an interface through which a command is input into the radio-signal receiver, an auxiliary controller analyzing the command and transmitting a signal indicative of an operation represented by the command, to the main controller, a display screen displaying the message, and a message analyzer analyzing the message and extracting data to be registered, the auxiliary controller making judgement as to whether a received message is able to be registered, based on analysis made by the message analyzer, and registering a received message automatically or manually, if a received message is judged to be able to be registered. The radio-signal transceiver makes it possible for a base station as a radio-signal transmitter to register various data in the radio-signal transceiver, which ensures simplification in input operation to be carried out by an operator.

14 Claims, 14 Drawing Sheets

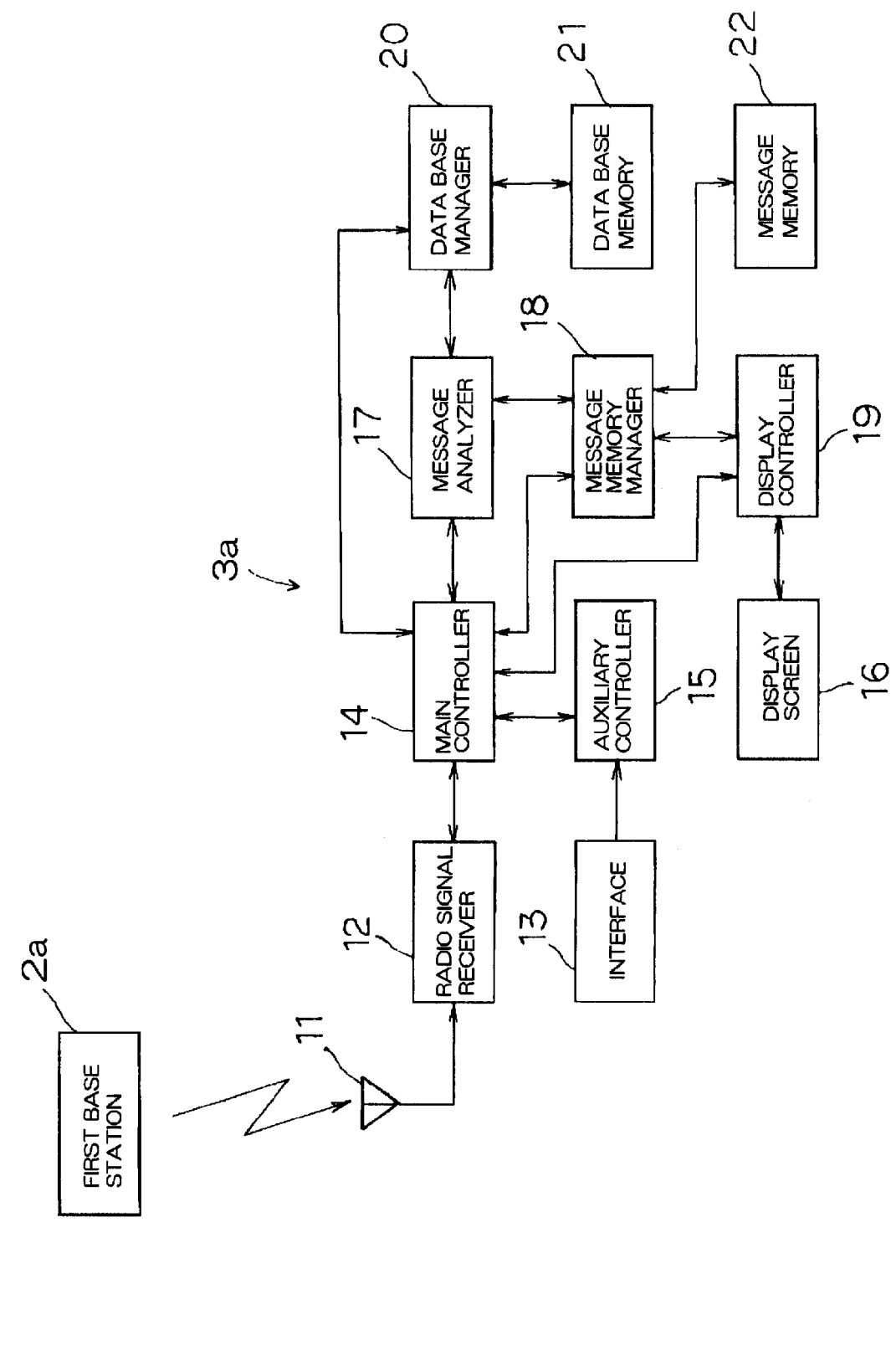

FIG. 4A

30 TELEPHONE DIRECTORY MEMORY

| MEMORY NO. | NAME | TEL. NO. | KIND OF TEL. |
|---|---|---|---|
| 0 | NAME-A | 1 | 02 |
| 1 | NAME-B | 1 | 03 |
| 2 | NAME-C | 1 | 00 |
| 3 | NAME-D | 1 | 01 |
| 4 | NAME-E | 1 | 02 |
| 5 | B. CLINTON | 0123-45-6789 | 01 |
| 6 | NON-REGISTERED | NON-REGISTERED | NON-REGISTERED |
| . | . | . | . |
| . | . | . | . |
| N-1 | NON-REGISTERED | NON-REGISTERED | NON-REGISTERED |
| N | NON-REGISTERED | NON-REGISTERED | NON-REGISTERED |

FIG. 4B

40 MESSAGE MEMORY

| NO. | RECEIVED MESSAGE DATA | | DATA & TIME | FIRST INDICATION | SECOND INDICATION |
|---|---|---|---|---|---|
| | ADDRESS | RECEIVED MESSAGE | | | |
| 0 | A | Good Night. | 7/16 23:33 | NONE | NONE |
| 1 | B | tel\|J. FONDA\|0987-65-3210\|02 | 7/17 08:26 | PRESENT | NONE |
| 2 | C | Good Morning. I will dropin XX. | 7/17 08:51 | NONE | NONE |
| 3 | A | Today's meeting is cancelled. | 7/17 10:05 | NONE | NONE |
| 4 | A | 1234567890 | 7/17 11:56 | NONE | NONE |
| 5 | A | tel\|B. CLINTON\|0123-45-6789\|01 | 7/17 13:48 | PRESENT | PRESENT |
| 6 | | NON-REGISTERED | | | |
| . | | . | . | . | . |
| . | | . | . | . | . |
| N-1 | | NON-REGISTERED | | | |
| N | | NON-REGISTERED | | | |

MESSAGE DATA (TELEPHONE DIRECTORY)

U-tel | B. CLINTON | 0123-45-6789 | 01

U- : CONTROL CODE tel : DATA IDENTIFIER

| : DELIMITER

B. CLINTON : NAME 0123-45-6789 : TELEPHONE NUMBER

01 : KIND OF TEL. (00 : PAGER / 01 : TELEPHONE / 02 : CELLULAR PHONE / 03 : OTHERS)

RADIO-SIGNAL TRANSCEIVER

BACKGROUND OF THE INVENTION

1. Field of the Invention

The invention relates to a radio-signal transceiver receiving a message transmitted from a base station and a method of controlling a radio-signal transceiver, and more particularly to a radio-signal transceiver which is capable of reducing a work volume of inputting data thereinto by an operator to thereby enhance serviceability thereof, and a method of controlling a radio-signal transceiver, capable of doing the same.

2. Description of the Related Art

There have been suggested various radio-signal transceivers. One of such radio-signal transceivers is disclosed in Japanese Unexamined Patent Publication No. 8-307919, as a radio-signal selective calling receiver. The disclosed radio-signal selective calling receiver is illustrated in FIG. 1. For instance, the illustrated radio-signal selective calling receiver 40 may be used as a pager or a pocket bell.

With reference to FIG. 1, the radio-signal selective calling receiver 40 is comprised of an antenna 41, a receiver 42 receiving a message through the antenna 41, a decoder 43 decoding a received message, a controller 44 controlling an operation of the radio-signal selective calling receiver 40, a memory 45 storing tables therein, a display screen 46 displaying a received message, an amplifier 47, a speaker 48 informing a user that a message has been received, and a switch 49.

The controller 44 includes a random access memory (RAM) 441 therein. The memory 45 includes a first table 451, a second table 452 and a third area 453.

The first table 451 contains a plurality of routine sentences having been made in advance. When the controller 44 judges to receive a specific code from a transmitter, the controller 44 reads a routine sentence associated with the received specific code, out of the first table 451, and displays the thus read-out sentence on the display screen 46. Such routine sentences to be stored in the first table 451 may be made by a manufacturer of a radio-signal selective calling receiver or a user.

The second table 452 is used for converting a received message into other language. For instance, if a received message contains Chinese characters, the received message is converted into the Japanese syllabary (kana), for instance. The third area 453 is an area for storing the thus converted message therein.

The radio-signal selective calling receiver 40 illustrated in FIG. 1 is designed to include two tables 451 and 452. When the radio-signal selective calling receiver 40 receives a message, the controller 44 reads out a control code assigned to a message at a head thereof. If the read-out control code indicates a routine sentence, the controller 44 converts the received message into a routine sentence through the first table 451, and displays the routine sentence on the display screen 46. If the read-out control code indicates a sentence other than a routine sentence, the controller 44 converts the received message into the Japanese syllabary, for instance, through the second table 452, and displays the thus converted sentence on the display screen 46.

In the conventional radio-signal selective calling receiver 40, characters and figures are input and registered through quite complicated operation, and specific data may be input thereinto. A message is transmitted from a transmitter to the radio-signal selective calling receiver 40 through a radio-signal, and data can be registered only from a single transmitter in one registration operation.

Hereinbelow is explained an operation of the radio-signal selective calling receiver 40.

A message addressed to a calling number of the radio-signal selective calling receiver 40 is received at the receiver 42 through the antenna 41. The thus received message is decoded by the decoder 43, and then, is transmitted to the controller 44. The controller 44 converts the received message into the Japanese syllabary, for instance, letter by letter through the second table 452 stored in the memory 45. When the controller 44 reads out a routine sentence registration code and a registration number appearing after a conversion completion code, the controller 44 stores the message having been converted into the Japanese syllabary, in association with the registration number, in the third area 453 in the memory 45.

As mentioned so far, a certain message is registered as a routine sentence in the conventional radio-signal selective calling receiver 40.

The radio-signal selective calling receiver 40 is designed to have the limited number of operation buttons because of downsizing of the receiver. As a result, characters and figures are input and registered in the radio-signal selective calling receiver 40 through quite complicated and laborious steps. The radio-signal selective calling receiver 40 is accompanied with a problem that it can register a received message relating to specific registration data, but cannot register received messages relating a plurality of registration data.

Some transceivers are designed to have an external interface function for making wiring communication and optical communication. However, if communication interface format were not unified, it would be impossible to register data in such transceivers, resulting in a problem that a user cannot readily register data.

In addition, if a plurality of users commonly use one data, each of users has to register data in each of their receivers. That is, in accordance with the conventional radio-signal selective calling receiver 40, it was not possible to register data in a plurality of the receivers in a single registration step.

Various radio-signal transceivers have been suggested as follows.

Japanese Unexamined Patent Publication No. 8-186635 has suggested a radio-signal selective calling receiver. In the suggested radio-signal selective calling receiver, received data is processed into telephone directory data, and stored in a memory. Data stored in a memory and individual message data are sorted. In addition, selected one among telephone directory data and individual message data is read out, and is erased. A certain individual calling address number is read out among telephone directory data stored in a memory, and is transmitted through a dialer. The radio signal selective calling receiver also includes a dialer connector terminal and a printer connector terminal such that individual message data can be printed through a printer connected thereto.

Japanese Unexamined Patent Publication No. 9-64761 has suggested a radio-signal receiver comprised of an antenna, a receiver receiving a radio-signal through the antenna, a data table obtaining a line of characters, based on data having been received at the receiver, associating a certain sentence made by a transmitter with an identifier for identifying the sentence to thereby make a routine sentence, and storing the sentence therein, a display screen displaying the line of characters having been obtained in the data table, an interface, and a controller controlling radio-signal receiving operation of the receiver, writing/reading operation of the data table, and display operation of the display screen, in accordance with a signal input through the interface.

Japanese Unexamined Patent Publication No. 9-65395 has suggested a method of storing a number in a memory of a pager, including the steps of calling the pager through a telephone, inputting a telephone number and associated data to be registered, into the telephone in the form of a message, and storing the telephone number and associated data, which have been received at the pager, in the memory.

Japanese Unexamined Patent Publication No. 9-247725 has suggested a mobile radio-signal transceiver transmitting a message stored in a memory in association with a predetermined number, in accordance with a selective-calling signal transmitted from a base station. The mobile radio-signal transceiver is comprised of means for judging whether the selective-calling signal contains a request to register a message, and means for storing the message in the memory in association with a number included in the selective-calling signal for indicating a memory to store the message therein, if the selective-calling signal contains the request.

Japanese Unexamined Patent Publication No. 5-63630 has suggested a selective-calling receiver comprised of means for displaying a received message, means for storing the received message, a message processing circuit which selects only necessary data among the message displayed, a message editing circuit which edits the selected data into a single document, and means for updating the thus edited message, storing the edited message in a memory, and displaying the stored message again.

Japanese Unexamined Patent Publication No. 7-23439 has suggested a method of outputting received data in a radio-signal selective calling handy receiver comprised of a circuit receiving a data signal transmitted thereto, a memory storing the data signal having been received at the circuit, a display device which displays that the data signal has been received. In this method, the received data signal stored in the memory is converted into optical signals, and then, is radiated into the air for transmitting to an opponent light receiver.

Japanese Unexamined Patent Publication No. 9-298604 has suggested an apparatus for making a message, comprised of a first memory in which routine message data is to be stored, means for selecting one or more of routine message data which is to be stored in the first memory, means for editing the thus selected routine message data, and a second memory in which the thus edited routine message data is stored.

Japanese Unexamined Patent Publication No. 10-98755 has suggested a radio-signal selective calling receiver which is capable of detecting data having been transmitted again and data having not been transmitted, even if the radio-signal selective calling receiver receives a transmission number older than the latest M transmission numbers.

Japanese Unexamined Patent Publication No. 10-191414 has suggested a radio-signal selective calling receiver including a memory storing telephone directory data consisting of telephone numbers and names, means for, when a message is received from a telephone number stored in the memory, displaying telephone number data associated with the telephone number, and means for extracting a telephone number and a name from the received message, and registering them in the memory as telephone directory data.

In spite of the radio-signal transceivers suggested in the above-mentioned Publications, the above-mentioned problems remain unsolved.

SUMMARY OF THE INVENTION

In view of the above-mentioned problems, it is an object of the present invention to provide a radio-signal transceiver in which a base station as a radio-signal transmitter can register various data such as a telephone directory, a routine sentence, alarm, figure and animation, as well as specific data, and which can simplify data-input operation to thereby enhance operability and serviceability for a user.

It is also an object of the present invention to provide a method of controlling a radio-signal transceiver which is capable of doing the same.

In one aspect of the present invention, there is provided a radio-signal transceiver including (a) an antenna, (b) a radio-signal receiver receiving a message having been received through the antenna, addressed to a calling number of the radio-signal transmitter, (c) a main controller controlling an operation of the radio-signal receiver, (d) an interface through which a command is input into the radio-signal receiver, (e) an auxiliary controller analyzing the command and transmitting a signal indicative of an operation represented by the command, to the main controller, (f) a display screen displaying the message, and (g) a message analyzer analyzing the message and extracting data to be registered, the auxiliary controller making judgement as to whether a received message is able to be registered, based on analysis made by the message analyzer, and registering a received message automatically or manually, if a received message is judged to be able to be registered.

The radio-signal transceiver may further includes (h) a message memory storing a received message therein, (i) a data base manager managing data extracted by the message analyzer, and 0) a data base memory storing data transmitted from the data base manager, the main controller reading message out of the message memory, and storing the thus read-out message in the data base memory, on receipt of a command to register a received message, transmitted from the interface.

It is preferable that the radio-signal receiver has capability of transmitting a message, the radio-signal receiver, on receipt of a command transmitted from the interface, reading a message out of the message memory and/or data base memory and transmitting the thus read-out message to an external printer through the antenna to thereby print the message.

It is preferable that the radio-signal receiver has capability of transmitting a message, the radio-signal receiver, if a received message contains an error, causing a base station to transmit the message thereto again.

There is further provided a radio-signal transceiver including (a) an antenna, (b) a radio-signal receiver receiving a message having been received through the antenna, addressed to a calling number of the radio-signal transmitter, (c) a main controller controlling an operation of the radio-signal receiver, (d) an interface through which a command is input into the radio-signal receiver, (e) an auxiliary controller analyzing the command and transmitting a signal indicative of an operation represented by the command, to the main controller, (f) a display screen displaying the message, and (g) a message analyzer analyzing the message and extracting data to be registered, the auxiliary controller making judgement as to whether a received message is able to be registered, based on analysis made by the message analyzer, and registering a received message automatically or manually, if a received message is judged to be able to be registered, the interface having a function of editing a message displayed on the display screen.

The radio-signal transceiver may further include (h) a message memory storing a received message therein, (i) a data base manager managing data extracted by the message analyzer, and (j) a data base memory storing data transmitted from the data base manager, the main controller reading message out of the message memory, and storing the thus read-out message in the data base memory, on receipt of a command to register a received message, transmitted from the interface, the interface reading message out of the message memory, and editing the thus read-out message.

The radio-signal transceiver may further include (h) a message memory storing a received message therein, (i) a data base manager managing data extracted by the message analyzer, and (j) a data base memory storing data transmitted from the data base manager, the interface reading message out of the data base memory, and editing the thus read-out message.

In another aspect of the present invention, there is provided a method of controlling a radio-signal transceiver, including the steps of (a) receiving a message addressed to a calling number of the radio-signal transceiver, (b) making judgement as to whether the thus received message is able to be registered, and (c) automatically or manually registering the received message, if the received message is judged to be able to be registered.

It is preferable that the method further includes the steps of (d) storing the received message in a message memory, and (e) reading the received memory out of the message memory, and storing the thus read-out message into a data base.

It is preferable that the method further includes the steps of (f) displaying the received message on a display screen, and (g) editing the received message on the display screen.

It is preferable that the method further includes the steps of (h) reading a message out of the message memory and/or data base, and (i) transmitting the thus read-out message to an external printer to thereby print the message.

It is preferable that the method further includes the step of causing a base station to transmit a message again, if the received message contains an error.

The advantages obtained by the aforementioned present invention will be described hereinbelow.

The radio-signal transceiver and the method of controlling the same both in accordance with the present invention makes it possible to register a received message in a simple operation. This ensures reduction in a work volume to be carried out by a user for registration, and enhances serviceability. As a result, whereas a line of characters or figures were registered through a complicated switch operation in a conventional radio-signal transceiver, a line of characters and figures can be registered by registering a received message without any additional operation, in accordance with the present invention. Thus, it is possible to reduce the number of switch operations.

Since a message can be registered by single transmission of a message, it would be possible to concurrently register a message in a plurality of radio-signal transceivers. When a calling number was commonly used by a group of users, data was conventionally registered in each of radio-signal transceivers. In contrast, in accordance with the present invention, data received as a message can be registered directly in the radio-signal transceiver, and in addition, can be concurrently registered in a plurality of radio-signal transceivers, ensuring enhancement of serviceability.

In addition, in accordance with the present invention, a received message is not only displayed on a display screen, but also can be printed out by means of a printer. Thus, all messages can be observed at the same time, and a message can be reserved in the form of a printed paper, when a memory is full of messages.

When there occurs an error for some reason while a message is being transmitted, the radio-signal transceiver may transmit a signal to a base station which signal is indicative of time zone in which a message has been transmitted. The base station transmits a message again to the radio-signal transceiver, and thus, the radio-signal transceiver can properly receive a message.

If a message is not an urgent one, a base station may be designed to store such non-urgent messages, and transmit them to the radio-signal transceiver when such non-urgent messages reach a predetermined amount. Thus, it is not necessary to keep a battery of the radio-signal transceiver on, ensuring saving power consumption.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 3 is a block diagram of a radio-signal transceiver in accordance with the first embodiment.

FIG. 4A illustrates an example of a structure of a telephone directory memory.

FIG. 4B illustrates an example of a structure of a message memory.

DESCRIPTION OF THE PREFERRED EMBODIMENTS

Figure 1:
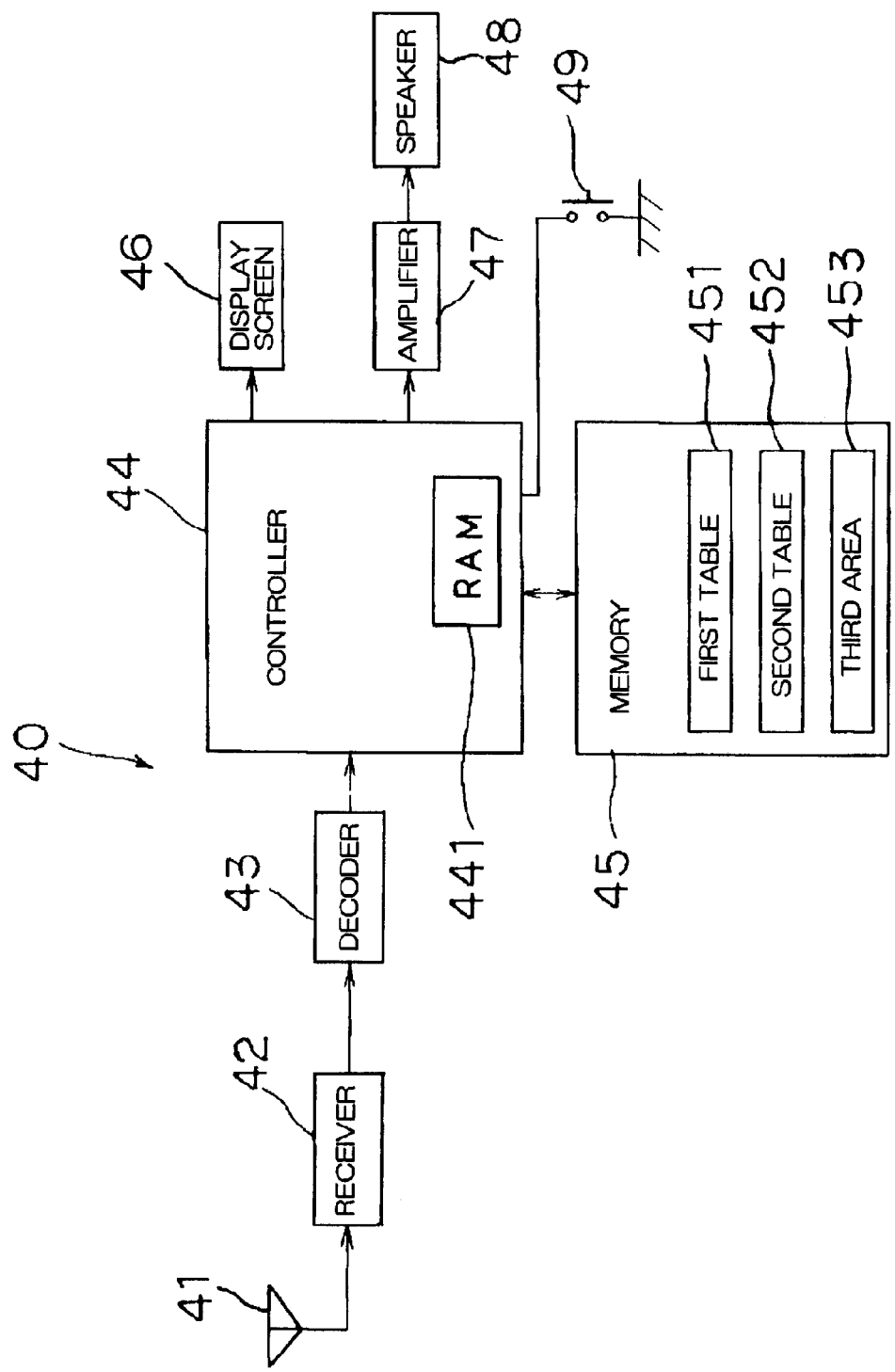
FIG. 1 is a block diagram of a conventional radio-signal selective calling receiver.
Figure 2:
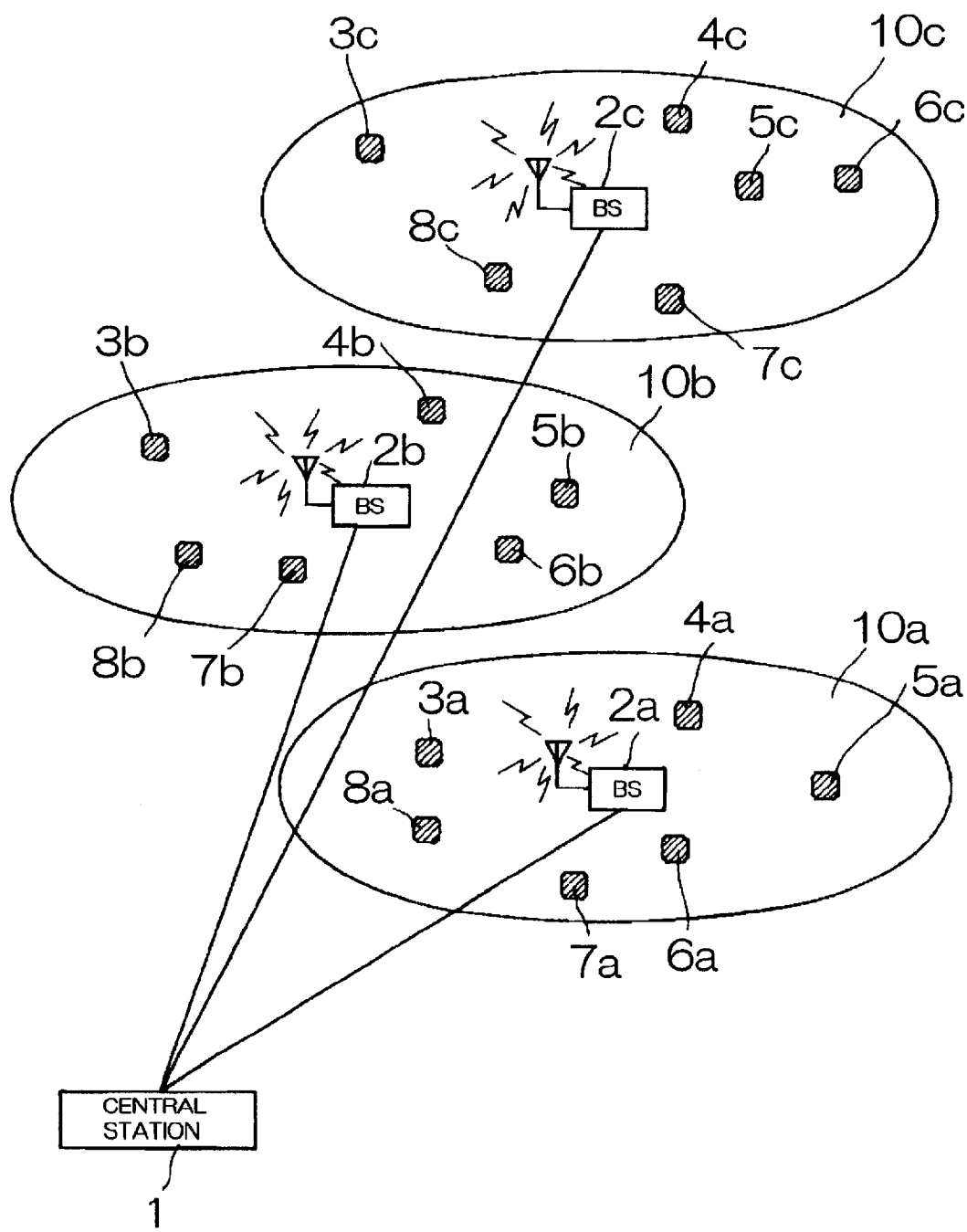
FIG. 2 is a schematic view illustrating a communication system including the radio-signal transceiver in accordance with the present invention.

FIG. 2 illustrates a communication system to which the radio-signal transceiver in accordance with the present invention is applied. As illustrated in FIG. 2, the communication system is comprised of a central station 1, first to third base stations 2a, 2b and 2c designed to make communication with the central station 1, and a plurality of radio-signal transceivers 3a to 8a, 3b to 8b and 3c to 8c designed to receive messages transmitted at a time from the first to third base stations 2a, 2b and 2c.

In FIG. 2, first to third service areas 10a, 10b and 10c in which a message can be transmitted to the radio-signal transceivers from the base stations extend around the first to third base stations 2a, 2b and 2c.

A service area is determined in dependence on a zone in which a user moves and radio-signal transmission capability of a base station. A service area can be grouped presently into regional service, wide area service, and multi-area service. The communication system illustrated in FIG. 2 is of multi-area service.

First Embodiment

FIG. 3 is a block diagram of the radio-signal transceiver 3a in accordance with the first embodiment. The radio-signal transceiver 3a belongs to the first service area 10a illustrated in FIG. 2.

As illustrated in FIG. 3, the radio-signal transceiver 3a is comprised of an antenna 11 receiving a calling signal transmitted from the base first station 2a and addressed to the radio-signal transceiver 3a, a radio-signal receiver 12, an interface 13 through which a command as to whether data is registered automatically or manually, and a command to register a message when a message is read out and displayed are input by a user, a main controller 14 controlling an operation of the radio-signal transceiver 3a, an auxiliary controller 15 controlling input signals transmitted from the interface 13, a display screen 16 displaying a received message, menu and so on, a message analyzer 17 analyzing a received message, a message memory manager 18 making association between the result of analysis carried out by the message analyzer 17 and a received message, a display controller 19 making data to be displayed such as a received message and menu, a data base manager 20 converting a received message into a memory format for various data, and registering the converted message, in accordance with the result of analysis transmitted from the message analyzer 17, a data base memory 21 in which data to be registered, transmitted from the data base manager 20, is stored, and a message memory 22 in which received message data transmitted from the message memory manager 18 is stored.

The antenna 11 is electrically connected to the radio-signal receiver 12, which is in turn electrically connected to the main controller 14. The interface 13 is electrically connected to the auxiliary controller 15. The main controller 14 controls operation of the auxiliary controller 15, the display controller 19, the message manager 18, the message analyzer 17, and the data base manager 20.

The message analyzer 17 is electrically connected to the message memory manager 18 and the data base manager 20, and the message manager 18 is electrically connected to the display controller 19 and the message memory 22. The data base manager 20 is electrically connected to the data base memory 21, and the display screen 16 is controlled in operation by the display controller 19.

Hereinbelow is explained an operation of the radio-signal transceiver 3a which receives a message from the first base station 2a.

With reference to FIG. 3, a message addressed to a calling number of the radio-signal transceiver 3a, transmitted from the first base station 2a, is received at the antenna 11, and then, decoded by the radio-signal receiver 12. Then, the thus decoded message is transmitted into the main controller 14.

A user in advance inputs a command through the interface as to whether received message data is to be registered automatically or manually. The auxiliary controller 15 receives the command from the interface 13, and transmits the command to the main controller 14. The main controller 14 receives a received message having been decoded by the radio-signal receiver 12, and informs the message analyzer 17 of both the command as to whether received message data is to be registered automatically or manually and a received message.

The message analyzer 17 analyzes whether the message is effective as data to be registered. If the command indicates that a message is to be automatically registered, the message analyzer 17 transmits the message to the data base manager 20. In addition, the message analyzer 17 transmits a received message, the result of analysis, and data as to whether a message was registered or not, to the message memory manager 18. If the command indicates that a message is to be manually registered, the message analyzer 17 transmits a received message, the result of analysis, and data as to whether a message was registered or not, to the message memory manager 18.

The data base manager 20 stores a received message, the result of analysis, and data as to whether a message was registered or not, in associated data storage areas in the data base memory 21, in accordance with a data identifier of data having been transmitted from the message analyzer 17.

The message memory manager 18 associates the transmitted message data to the result of analysis, and then, stored the message data in the message memory 22. Thereafter, the message memory 18 transmits the message data and information about the association to the display controller 19.

A command as to whether a message is to be registered automatically or manually is input through the interface 13 by a user, and the command is transmitted to the message analyzer 17. The message analyzer 17 makes final judgement as to whether a message is registered automatically or manually. In the above-mentioned association in message data, a received message is judged whether it is just a message or data containing a name and a telephone number therein, based on the result of analysis carried out by the message analyzer 17, and a received message is judged to be registered or not. This association step is important when a received message is stored in the message memory 22.

The display controller 19 makes data, based on message data and data of association having been received, and displays the thus made data on the display screen 16.

FIG. 4A illustrates an example of a structure of a telephone directory memory 30 included in the data base memory 21, and FIG. 4B illustrates an example of a structure of a message memory 40 included in the message memory 22.

As illustrated in FIG. 4A, the telephone directory memory 30 includes items of a telephone directory memory number 31, a name 32, a telephone number 33, and a kind 34 of a telephone. In a kind 34 of a telephone, "00", "01", "02" and "03" indicate a pager, a telephone, a cellular phone, and others, respectively.

As illustrated in FIG. 4B, the message memory 40 includes items of a memory management number 41, received message data 42, date and time 43 at which a message has been received, a first indication 44 indicating whether a received message is just a message or data, and a second indication 45 indicating whether a message is to be registered. The item of the received message data 42 further includes an address 42a in which received message data is stored, and a received message 42b stored in the address 42a.

A memory structure of the message memory 22 and the data base memory 21 is not to be limited to the example illustrated in FIGS. 4A and 4B, respectively, and may be changed into a desired one.

The message memory 40 is just a temporarily used memory for storing a message received from a base station each time, whereas the telephone directory memory 30 is a permanently used memory for grouping a received message stored in the message memory 40, into a name, a telephone number and a kind of a telephone.

Figures 5A, 5B:
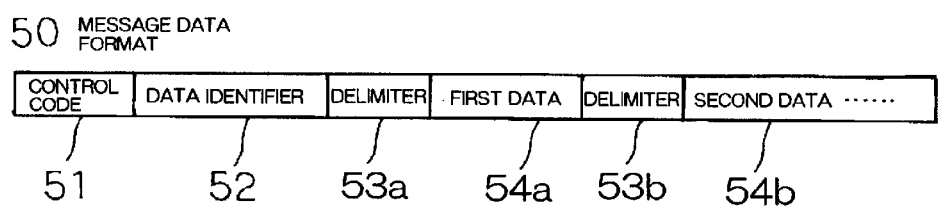
FIG. 5A illustrates an example of a message format to be transmitted from a base station to the radio-signal transceiver in accordance with the present invention.
FIG. 5B illustrates an example of message data in each of items in the message format illustrated in FIG. 5A.

FIG. 5A illustrates an example of a message format transmitted from the first base station 2a to the radio-signal transceiver 3a, and FIG. 5B illustrates an example of message data in items of the message format example 50 illustrated in FIG. 5A.

The message data is arranged in such an order as illustrated in FIG. 5A. Specifically, the message data format 50 includes a control code 51, a data identifier 52, first data 54a to be registered, and second data 54b to be registered in this order. The data identifier 52 is separated from the first data 54a by a delimiter 53a, and the first data 54a is separated from the second data 54b by a delimiter 53b.

FIG. 5B details the items of the message data format 50. As illustrated in FIG. 5B, the message data include the control code 51 which distinguishes the message data from an ordinary message, the data identifier 52 identifying what is registered, a name, a telephone number, and a kind of a telephone.

In the instant embodiment, a code "U-" is employed as the control code 51. The control code "U-" indicates that a message subsequent to the control code "U-" is data to be registered. In the presently widely used pager system, a code "- -" is employed as a control code in a free message, and a code "[[" is employed as a control code in a message consisting of routine sentences.

The data identifier 52 identifies content of data to be registered. For instance, there may be used "TEL" for telephone directory data, "MES" for a free message, and "ROU" for a message consisting of routine sentences, as the data identifier 52.

Each of the items in the message data format 50 illustrated in FIG. 5A may be designed to have any number of bytes in dependence on radio-signal receiving capability of a radio-signal transceiver and a demand of a user. However, when a message including a long sentence is to be transmitted, it may be necessary to increase a transmission rate. A base station having a function of changing a transmission rate could do so.

Figure 6:
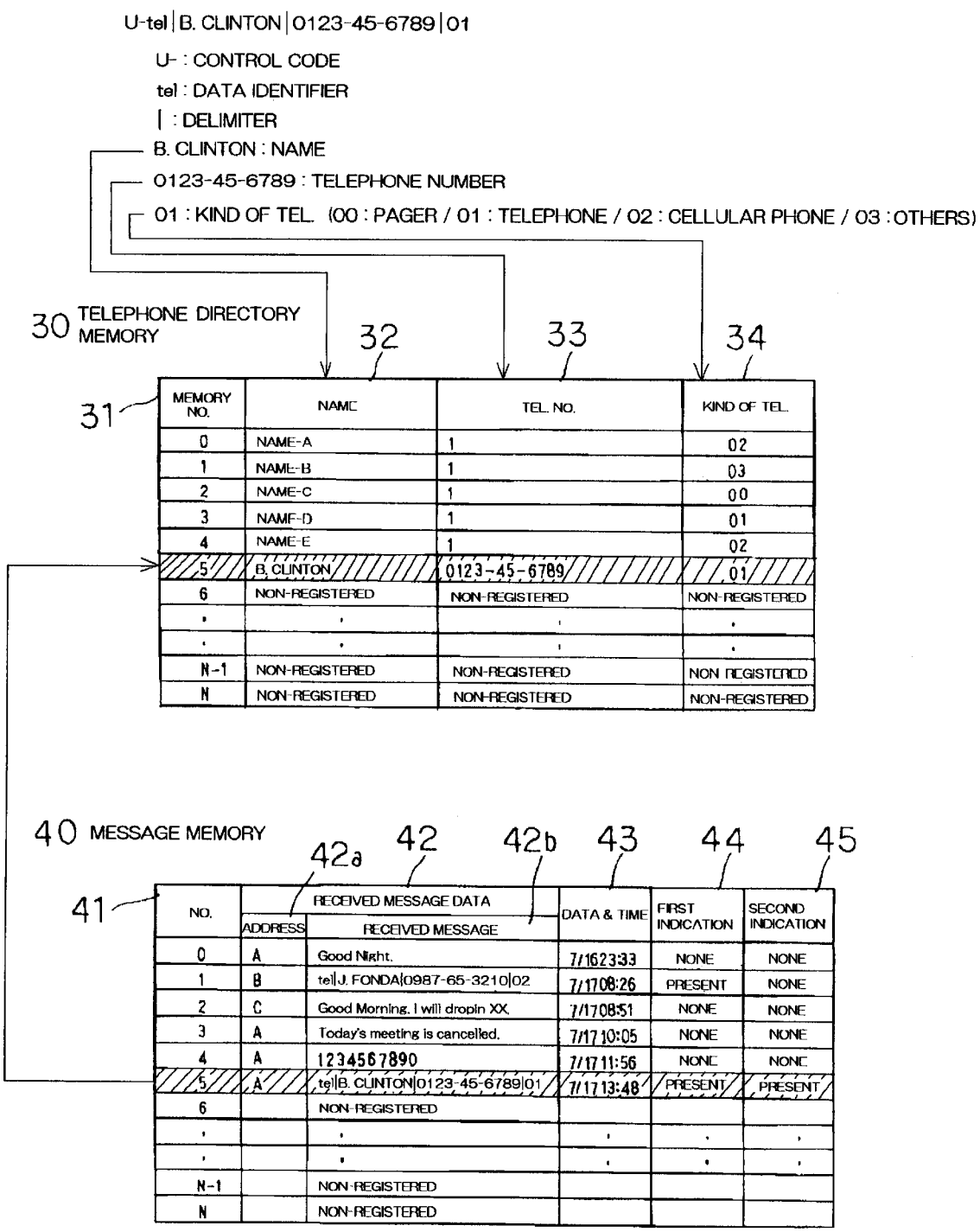
FIG. 6 illustrates what is stored in a data base memory and where message data is stored in the data base memory.

FIG. 6 illustrates where a received message is stored in the message memory 22 and the data base memory 20. As illustrated in FIG. 6, a name of a message receiver is stored in a column 32, a telephone number is stored in a column 33, and a king of a telephone is stored in a column 34 in the telephone directory memory 30. A hatched row in the data base memory 40 is stored into the telephone directory memory 30. In FIG. 6, the fifth row numbered 5 in the data base memory 40 is stored into the telephone directory memory 30.

Figure 7:
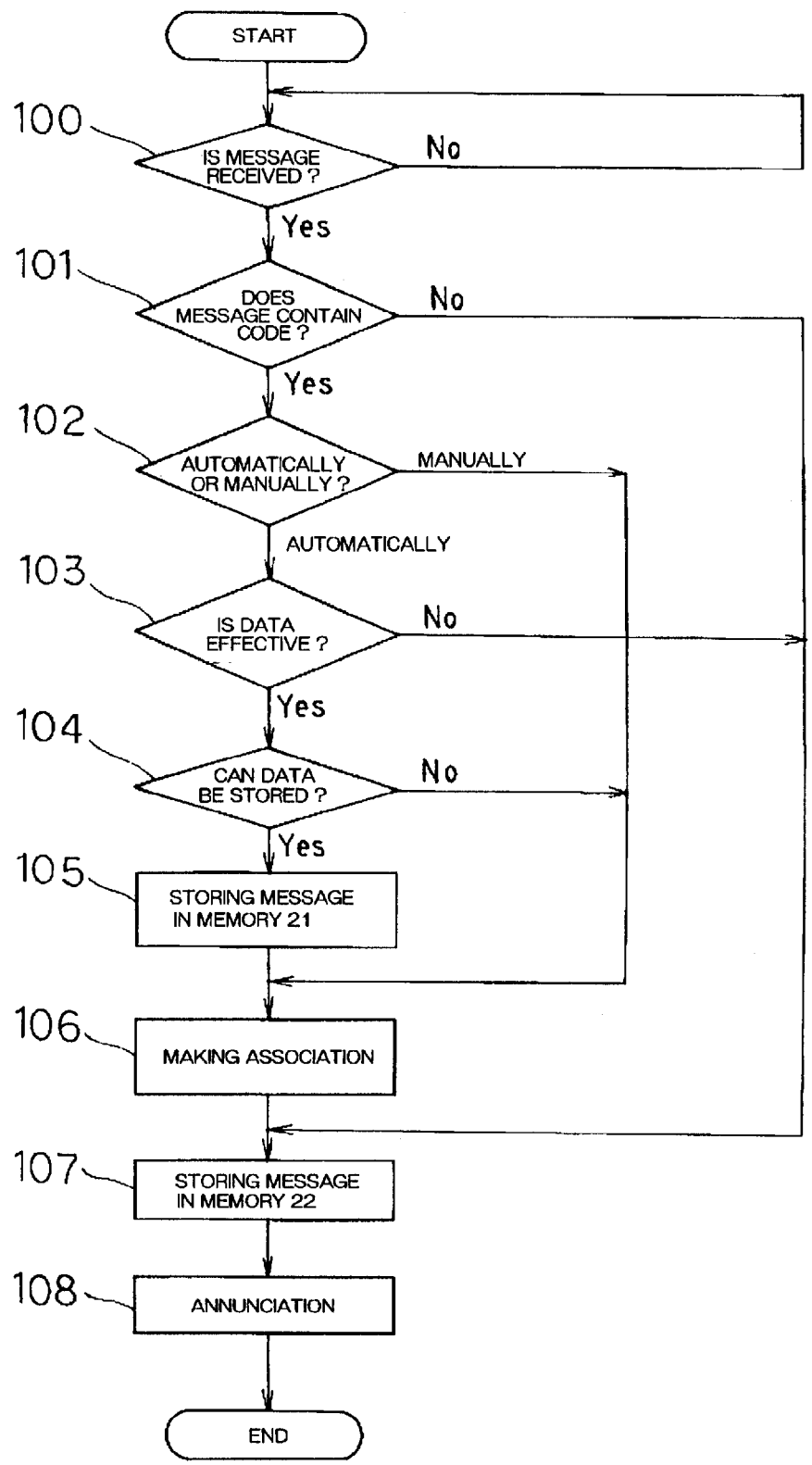
FIG. 7 is a flow chart showing an operation for receiving a message in the first embodiment.

FIG. 7 is a flow chart showing an operation of receiving a message in the radio-signal transceiver 3a in accordance with the first embodiment. In the illustrated operation, the radio-signal transceiver 3a receives a message from the first base station 2a, stores the received message in a memory, and annunciates a user that a message has been received.

With reference to FIG. 7, the main controller 14 makes judgement as to whether a message has been received from the first base station 2a in step 100.

If the main controller judges to have received a message (YES in step 100), the main controller 14 transmits both a received message having been decoded by the radio-signal receiver 12 and data as to whether a message is to be registered automatically or manually which data was transmitted from the auxiliary controller 15, to the message analyzer 17.

If the main controller 14 judges not to have received a message (NO in step 100), the main controller 14 waits for a message transmitted from the first base station 2a.

The message analyzer 17 receives a received message and data as to whether a message is to be registered automatically or manually, from the main controller 14, analyzes the received message, and makes judgement as to whether the message contains the control code 51, the data identifier 52 and the delimiter 53 in step 101.

If the message analyzer 17 does not contain the control code 51 (NO in step 101), the data identifier 52 and the delimiter 53, a later mentioned step 107 of storing a message starts. If the message analyzer 17 contains the control code 51, the data identifier 52 and the delimiter 53 (YES in step 101), the message analyzer 17 makes judgement as to whether a message is to be registered automatically or manually in step 102.

If the message analyzer 17 judges in step 102 that a message is to be registered automatically, the message analyzer 17 informs the data base manager 20 of data to be registered. If the message analyzer 17 judges in step 102 that a message is to be registered manually, a later mentioned step 106 of making association starts.

The data base manager 20 receives data to be registered, from the message analyzer 17, and then, makes judgement as to whether a received message is effective data or not in step 103.

If the data base manager 20 judges in step 103 that a received message is effective data (YES in step 103), the data base manager 20 makes judgement as to whether data is able to be stored in the data base memory 18, in step 104. If the data base manager 20 judges in step 103 that a received message is not effective data (NO in step 103), a later mentioned step 107 of storing a message starts.

If the data base manager 20 judges in step 104 that data is able to be stored in the data base memory 18, the data base manager 20 stores data in the data base memory 21 in accordance with a memory structure of data to be registered, in step 105, and informs the message analyzer 17 that data has been stored in the data base memory 21. If the data base manager 20 does not judge in step 104 that data is able to be stored in the data base memory 18, a later mentioned step 106 of making association starts.

The message analyzer 17 having been informed that data has been stored in the data base memory 21 carries out a step 106 of associating received message data to both first judgement as to whether a received message is just a message or data containing a name, a telephone number and so on, and second judgement as to whether a received message is to be registered. Then, the message analyzer 17 informs the message memory manager 18 that the step 106 has been carried out.

The message memory manager 18 stores the message in the message memory 22 in accordance with a memory structure, in step 107. After the message has been stored in the message memory 22, data about the above-mentioned first and second judgements is transmitted to the display controller 19 from the message memory manager 18.

The display controller 19 then converts the received message data and the above-mentioned first and second judgements into displayable data, and transmits the thus converted data to the display screen 16. The display screen 16 displays the received data thereon. The display controller 19 starts annunciation in step 108.

The annunciation in step 108 may be made by making sound, radiating a light beam, or making vibration.

Figure 8:
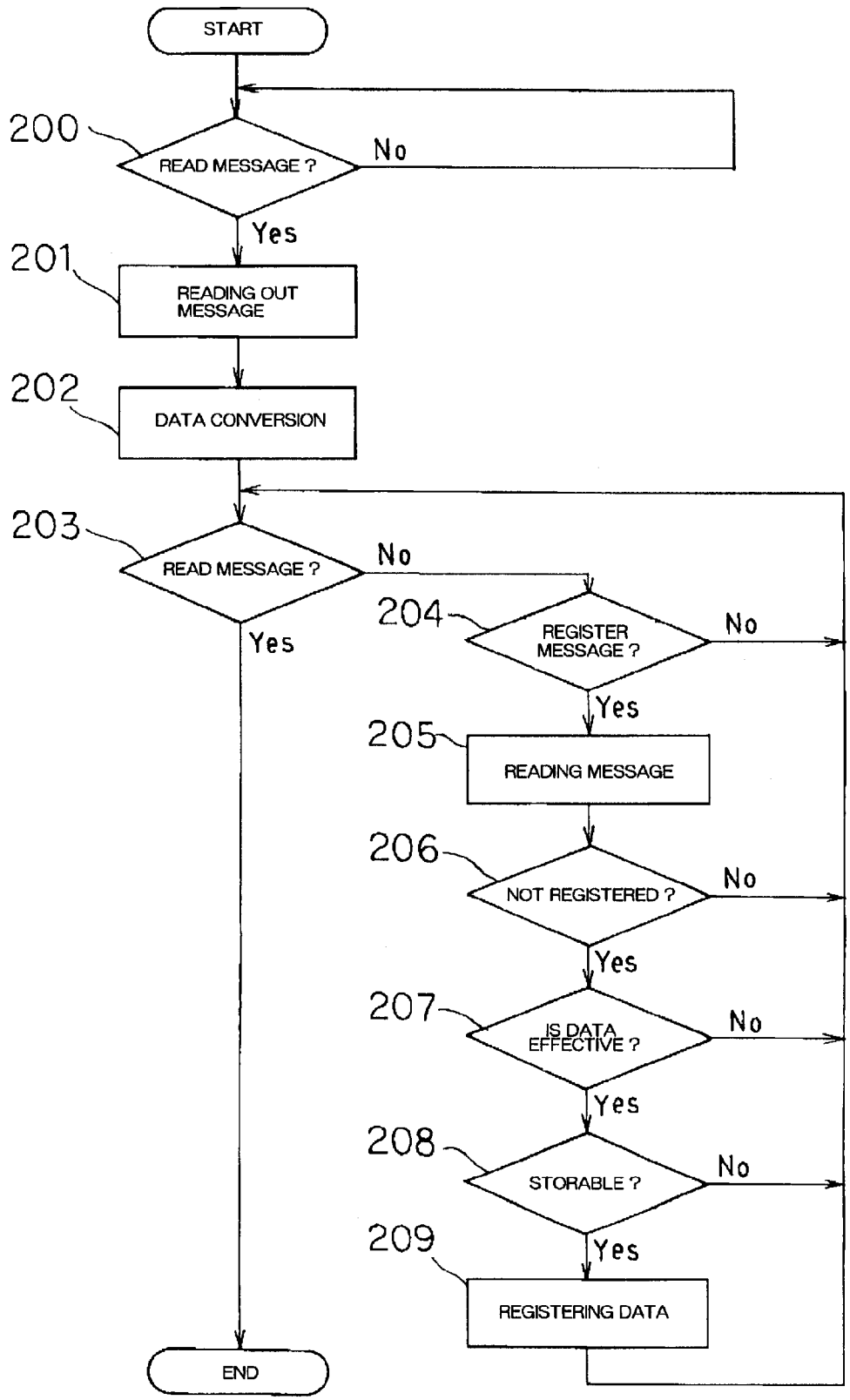
FIG. 8 is a flow chart showing an operation for reading out a message and registering the message in the first embodiment.

FIG. 8 is a flow chart showing an operation of reading out a message and registering the message in the radio-signal transceiver 3a in accordance with the first embodiment. In FIG. 8, a message is read out of the message memory 22, and then, stored in the data base memory 21.

The auxiliary controller 15 checks whether a command to read a message is transmitted from the interface 13, in step 200. If the auxiliary controller 15 detects a command to read a message in step 200, the auxiliary controller 15 requests the main controller 14 to start reading a message. Then, the main controller 14 transmits a command to the message memory manager 18 to read out a message.

The message memory manager 18 receiving a command to read a message from the main controller 14 reads the message and the above-mentioned first and second judgements out of the message memory 22, in step 201, and then, the thus read out message and first and second judgements are transmitted to the display controller 19.

Then, the display controller 19 converts the received message into displayable data, and further converts the received first and second judgements into displayable data, in step 202. The thus converted data is transmitted to the display screen 16, and then, is displayed on the display screen 16.

Then, the auxiliary controller 15 checks whether a command to cease reading a message is transmitted from the interface 13, in step 203. If the auxiliary controller 15 detects a command to cease reading a message in step 203 (YES in step 203), the auxiliary controller 15 transmits a signal to the display controller 19 through the main controller 14 which signal indicates that displaying a message should be ceased. Thus, a message displayed on the display screen 16 is cleared. Thus, the operation is finished.

If the auxiliary controller 15 does not receive a command to cease reading a message (NO in step 203), the auxiliary controller 15 checks whether a command to register a message is transmitted from the interface, in step 204.

If the auxiliary controller 15 detects a command to register a message in step 204 (YES in step 204), the auxiliary controller 15 requests the main controller 14 to start registration of a designated message. The main controller 14 requested to do so transmits a command to register the message, to the message analyzer 17.

Then, the message analyzer 17 requests the message memory manager 18 to transmit the message and the above-mentioned first and second judgements back to the message analyzer 17.

If the auxiliary controller 15 does not detect a command to register a message in step 204 (NO in step 204), the above-mentioned step 203 starts again.

The message memory manager 18 requested by the message analyzer 17 reads the message and the first and second judgements out of the message memory 22, in step 205. The thus read-out message and first and second judgements are transmitted to the message analyzer 17 from the message memory manager 18.

Then, the message analyzer 17 checks whether the received data is not yet registered, in step 206. If the message analyzer 17 judges that the received data is not yet registered (NO in step 206), the received data is transferred to the data base manager 20. If the message analyzer 17 judges that the received data has been already registered (YES in step 206), the step 203 starts again.

Then, the data base manager 20 checks whether the received data is effective or not, in step 207. If the received data is judged by the data base manager 20 to be not effective (NO in step 207), the step 203 starts again. If the received data is judged by the data base manager 20 to be effective (YES in step 207), the received data is further checked as to whether the received data is in such a condition that the received data can be stored in the data base memory 21, in step 208.

If the received data is judged in step 208 to be unable to be stored in the data base memory 21 (NO in step 208), the step 203 starts again. If the received data is judged in step 208 to be able to be stored in the data base memory 21 (YES in step 208), the data base manager 20 stores the received data in the data base memory 21 in accordance with a memory structure of the received data, in step 209.

As mentioned above, in accordance with the instant embodiment, when a received message contains a control code and a data identifier, it would be possible to store and register data in each of areas in the data base memory 21 by virtue of the data identifier. The thus registered data can be dealt with in the same manner as data registered later by a user through switching operation, which ensures reduction a work volume in data input operation to be carried out by a user.

In addition, since a user is allowed to select whether a received message is automatically registered immediately after it has been received, or manually registered in accordance with a command input by a user after a received message has been displayed, it would be possible to enhance serviceability for a user.

A command to register a message may be input by a user through the interface 13, or may be contained in a message to be registered.

Second Embodiment

Figure 9:
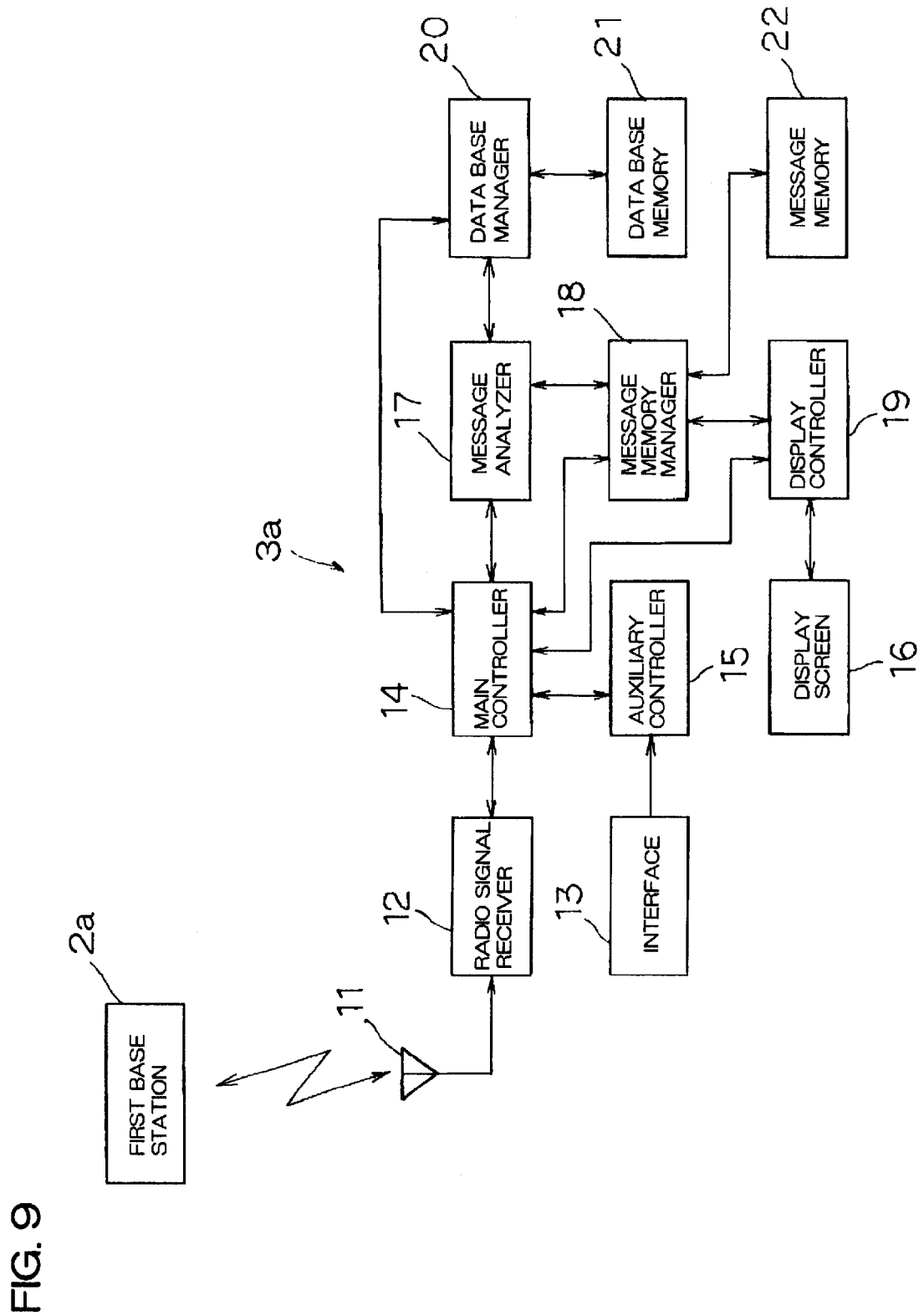
FIG. 9 is a block diagram of a radio-signal transceiver in accordance with the second embodiment.

FIG. 9 is a block diagram of a radio-signal transceiver 3a in accordance with the second embodiment.

The radio-signal transceiver 3a in accordance with the second embodiment is designed to have the same structure as the structure of the radio-signal transceiver 3a in accordance with the first embodiment except that the interface 13 is electrically connected to the display screen 16, that the display controller 19 is electrically connected to the data base memory 20, and that the interface 13 has a function of editing a received message. Parts or elements that correspond to those of the radio-signal transceiver illustrated in FIG. 3 have been provided with the same reference numerals.

The interface 13 in the second embodiment reads a message out of the message memory 22 or the data base manager 21, displays the read-out message on the display screen 16, and edits the read-out message, if necessary.

Figure 10:
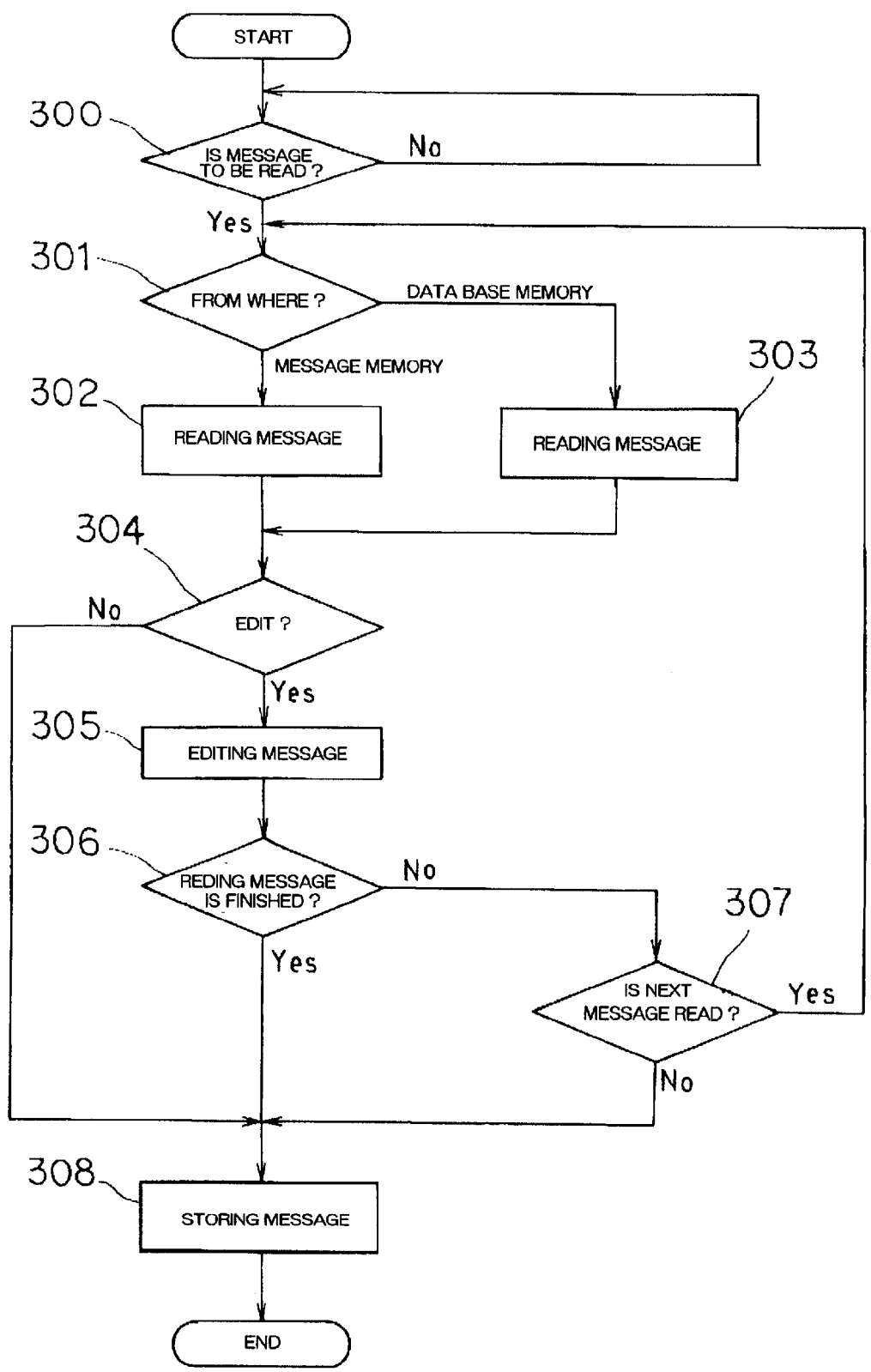
FIG. 10 is a flow chart showing an operation for reading out a message and editing the message in the second embodiment.

FIG. 10 is a flow chart showing an operation of reading out a message and editing a read-out message in the radio-signal transceiver in accordance with the second embodiment.

The auxiliary controller 15 checks whether a command to read and edit a message or a command to store a received message is transmitted from the interface 13, in step 300. If the auxiliary controller 15 detects a command to read a message (YES in step 300), the auxiliary controller 15 requests the main controller 14 to start reading a message.

The main controller 14 transmits a command to read the message, to the message memory manager 18 or the data base manager 20.

The main controller 14 makes judgement as to where a message is read out of, in step 301. If a message is judged to be read out of the message memory 22 in step 301, the auxiliary controller 15 transmits a signal to the message memory manager 18. On receipt of the signal from the auxiliary controller 15, the message memory manager 18 reads the message out of the message memory 22 in step 302.

If a message is judged to be read out of the data base memory 21 in step 301, the auxiliary controller 15 transmits a signal to the data base manager 20. On receipt of the signal from the auxiliary controller 15, the data base manager 20 reads the message out of the data base memory 21 in step 303.

The thus read out message is transmitted to the display controller 19 from the data base manager 20. The display controller 19 converts the received message into displayable data, and transmits the thus converted displayable data to the display screen 16. The display screen 16 displays the thus received data thereon.

Then, it is judged as to whether the displayed message is to be edited, in step 304. If the message is to be edited (YES in step 304), the message is edited in accordance with an instruction input by a user through the interface 13, in step 305.

After the message has been edited, the auxiliary controller 15 checks whether a command to finish reading a message or a command to store a message/data is transmitted from the interface 13, in step 306. If the auxiliary controller 15 detects a command to finish reading a message (YES in step 306), the auxiliary controller 15 transmits a signal to the display controller 19 to instruct to finish displaying the message. Thus, the message displayed on the display screen 16 is cleared.

Then, the auxiliary controller 15 transmits a signal the message memory manager 18 or the data base manager 20, indicating that the step of reading a message has been finished. On receipt of the signal from the auxiliary controller 15, the message memory manager 18 or the data base manager 20 stores the message/data in the message memory 22 or the data base memory 21, in step 308.

If the auxiliary controller 15 does not detect a command to finish reading a message (NO in step 306), it is judged as to whether a next message is to be read out in step 307. If a next message is to be read out in step 307 (YES in step 307), the step 301 starts again. That is, a next message is read out or edited in the same manner as mentioned above. If a next message is not to be read out in step 307 (NO in step 307), the above-mentioned step 308 is carried out.

As having been explained so far, in accordance with the second embodiment, a received message can be not only displayed on the display screen 16, but also edited in combination of characters, a table, a graph and/or images. That is, the radio-signal transceiver 3a in accordance with the second embodiment can positively make use of a message as well as receive a message from the base station 2a. In this sense, the radio-signal transceiver 3a in accordance with the second embodiment has the same functions as those of a cellular phone.

Third Embodiment

Figure 11:
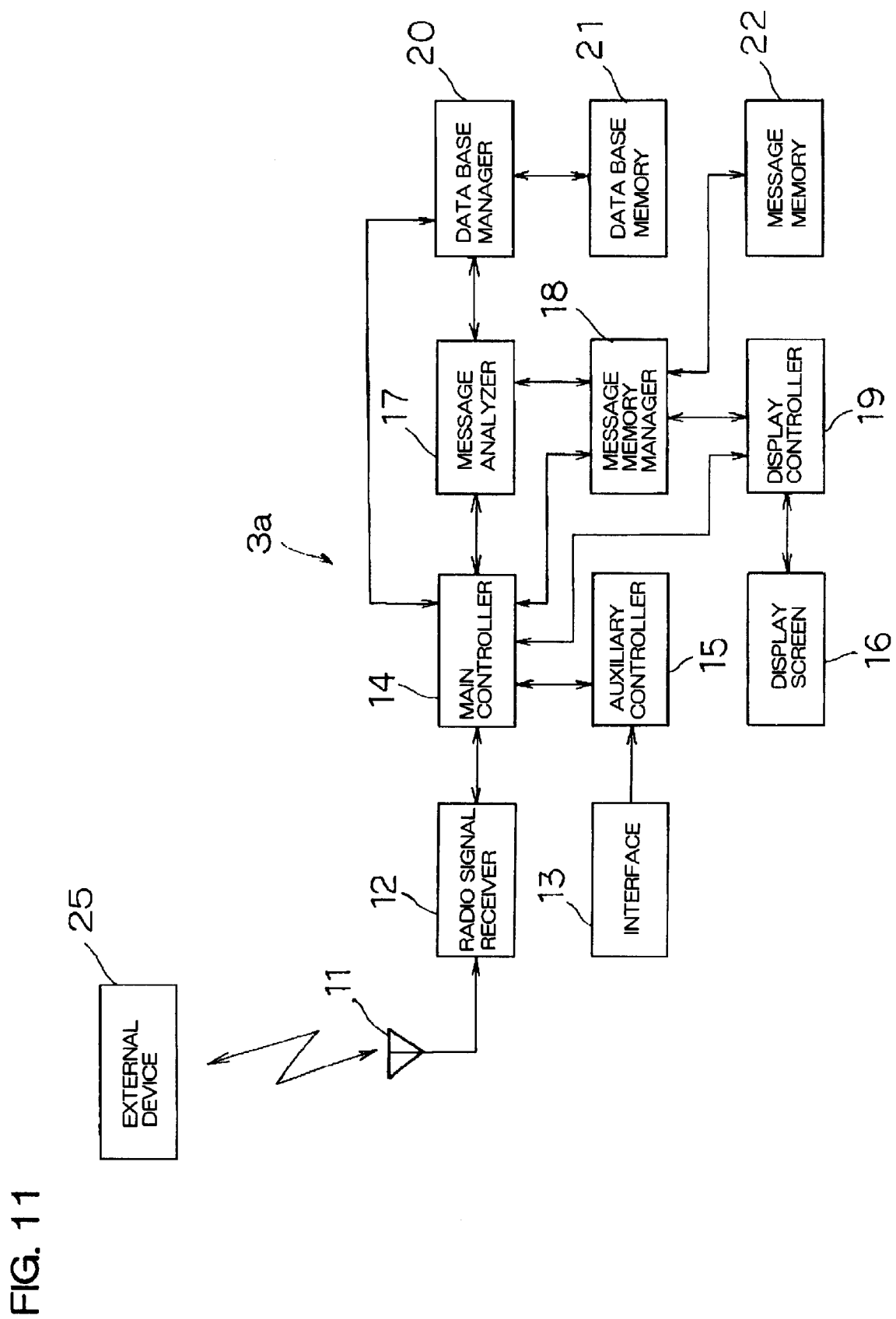
FIG. 11 is a block diagram of a radio-signal transceiver in accordance with the third embodiment.

FIG. 11 is a block diagram of a radio-signal transceiver 3a in accordance with the third embodiment.

The radio-signal transceiver 3a in accordance with the third embodiment is designed to have the same structure as the structure of the radio-signal transceiver 3a in accordance with the first embodiment except that the antenna 11 is designed to be able to transmit a radio-signal as well as receive a radio-signal. Parts or elements that correspond to those of the radio-signal transceiver illustrated in FIG. 3 have been provided with the same reference numerals.

In accordance with the third embodiment, a message read out of the message memory 22 or the data base memory 21 is transmitted to an external device 25 such as a printer, a facsimile, and a personal computer through the antenna 11. Thus, a message can be printed out by the printer 2a, or stored in a recording medium equipped in a personal computer 2a, such as a hard disc or a floppy disc.

Figure 12:
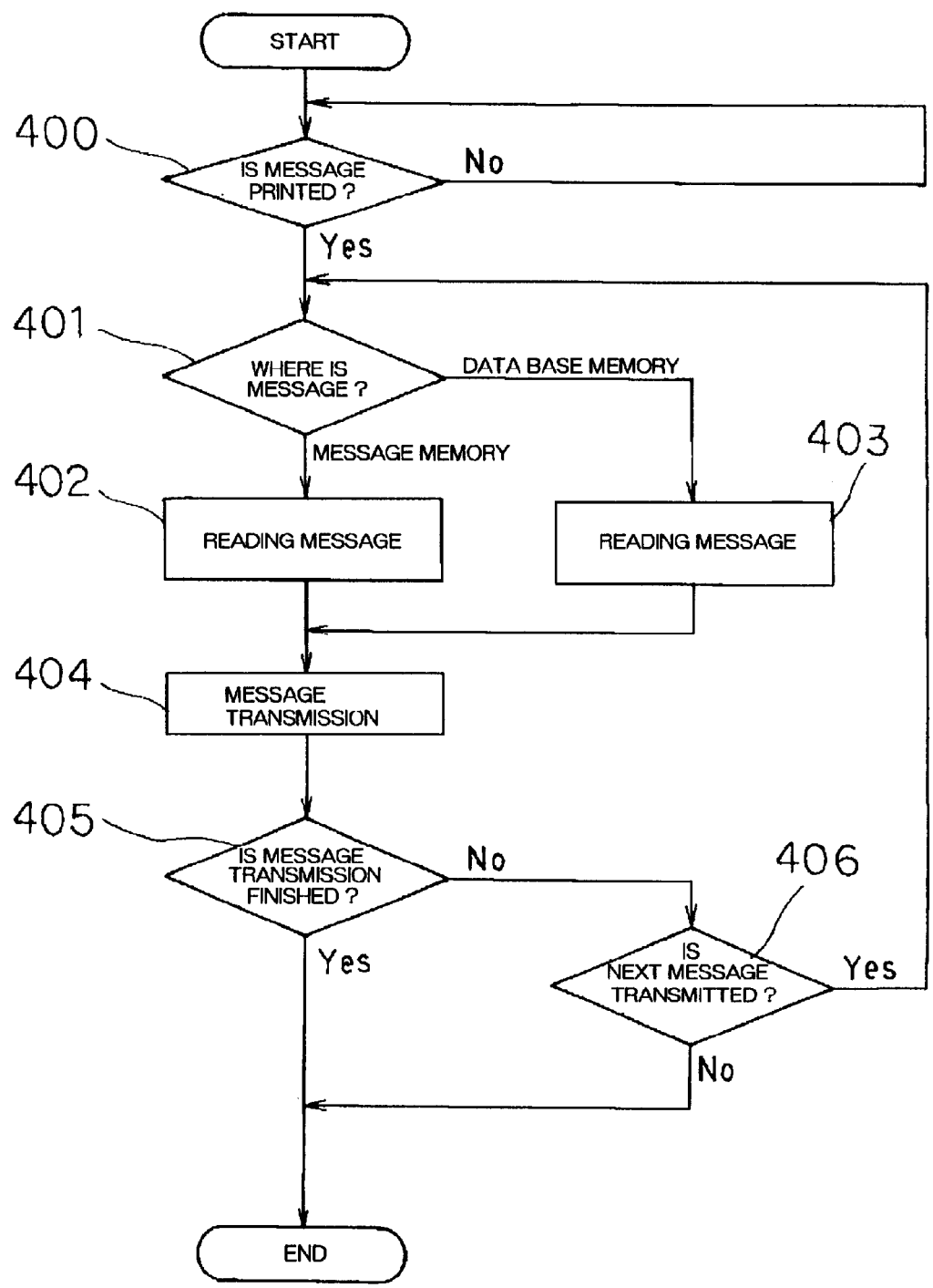
FIG. 12 is a flow chart showing an operation for printing out a message in the third embodiment.

FIG. 12 is a flow chart showing an operation of printing out a message in the radio-signal transceiver in accordance with the third embodiment.

With reference to FIG. 12, the auxiliary controller 15 checks whether a command to print out a message is transmitted from the interface 13, in step 400. If the auxiliary controller 15 detects such a command in step 400, the auxiliary controller 15 requests the main controller 14 to start reading a message. Then, the main controller 14 instructs the message memory manager 18 or the data base manager 20 to read out a message in question.

Then, the main controller 14 makes judgement in step 401 as to where a message is read out. If a message is judged to be read out of the message memory 22 in step 401, the message memory manager 18 reads the message out of the message memory 22 in step 402. If a message is judged to be read out of the data base memory 21 in step 401, the data base manager 20 reads the message out of the data base memory 21 in step 403.

The thus read-out message is transmitted to the external device 25 such as a printer through the antenna 11, to thereby print out a message in step 404. When a message has been entirely printed out, it is judged as to message transmission is to be finished, in step 405. If message transmission is to be finished (YES in step 405), the message-printing operation is finished.

If message transmission is to be continued (NO in step 405), it is judged as to whether a next message is to be transmitted, in step 406. If a next message is transmitted (YES in step 406), the steps 401 to 405 are repeated.

In the third embodiment, a message is transmitted to the external device 25 such as a printer through a radio-signal.

However, it should be noted that the radio-signal transceiver 3a may be connected directly to the external device 25 through either a cable or a connector. As an alternative, a message may be transmitted to a printer for printing out via a memory equipped in a personal computer 2a.

In accordance with the third embodiment, it is possible to display both on the display screen 6 and in the form of a printed paper. Hence, all messages can be observed at a time, and messages can be stored in the form of papers when a memory is full of messages.

Fourth Embodiment

Figure 13:
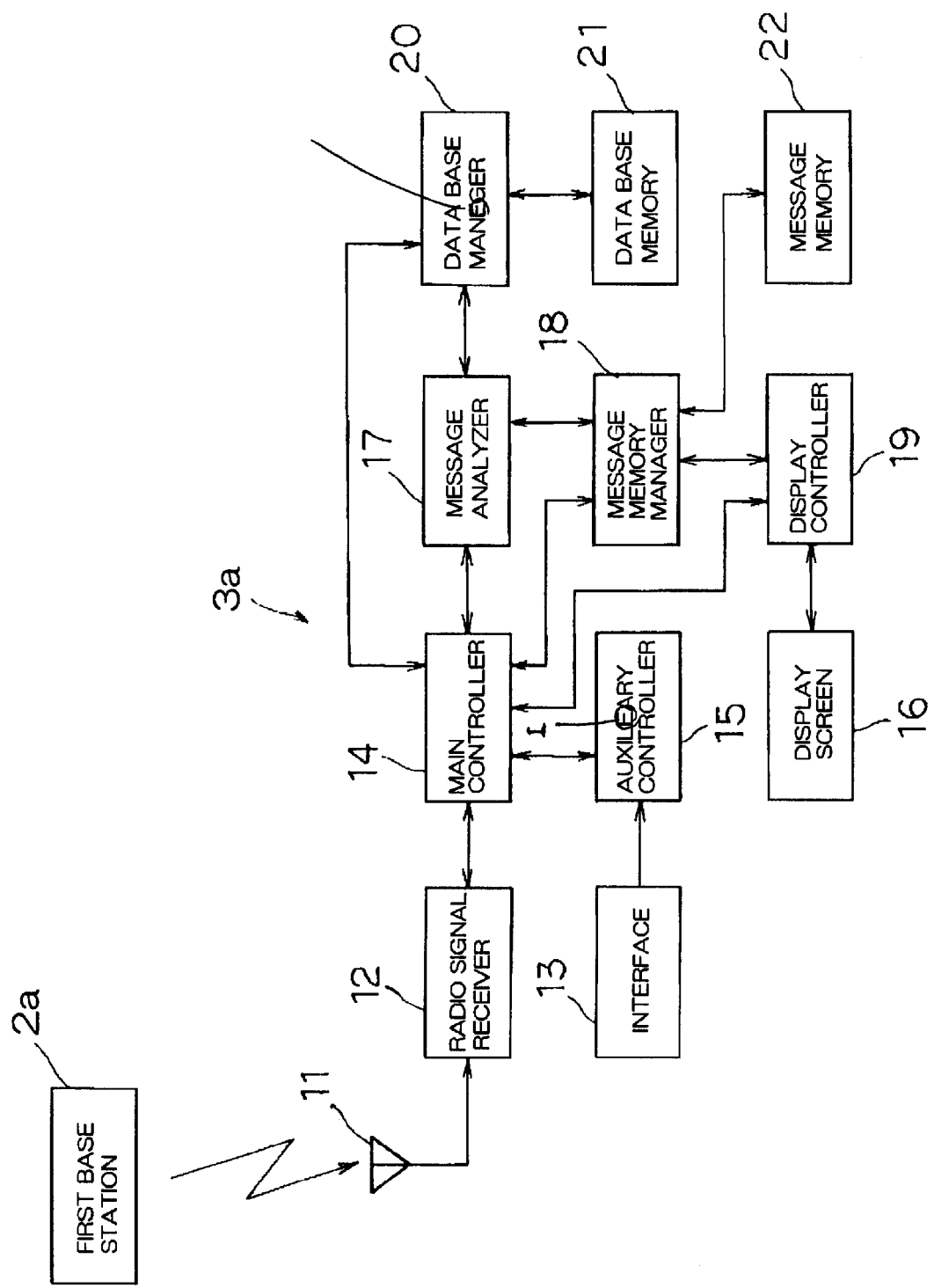
FIG. 13 is a block diagram of a radio-signal transceiver in accordance with the fourth embodiment.

FIG. 13 is a block diagram of a radio-signal transceiver 3a in accordance with the fourth embodiment.

The radio-signal transceiver 3a in accordance with the fourth embodiment is designed to have the same structure as the structure of the radio-signal transceiver 3a in accordance with the first embodiment except that the antenna 11 is designed to be able to transmit a radio-signal as well as receive a radio-signal. Parts or elements that correspond to those of the radio-signal transceiver illustrated in FIG. 3 have been provided with the same reference numerals.

In accordance with the fourth embodiment, the radio-signal transceiver 3a can ask the base station 2a to transmit a message again, and inform the base station 2a of a time zone in which a message has been transmitted.

Figure 14:
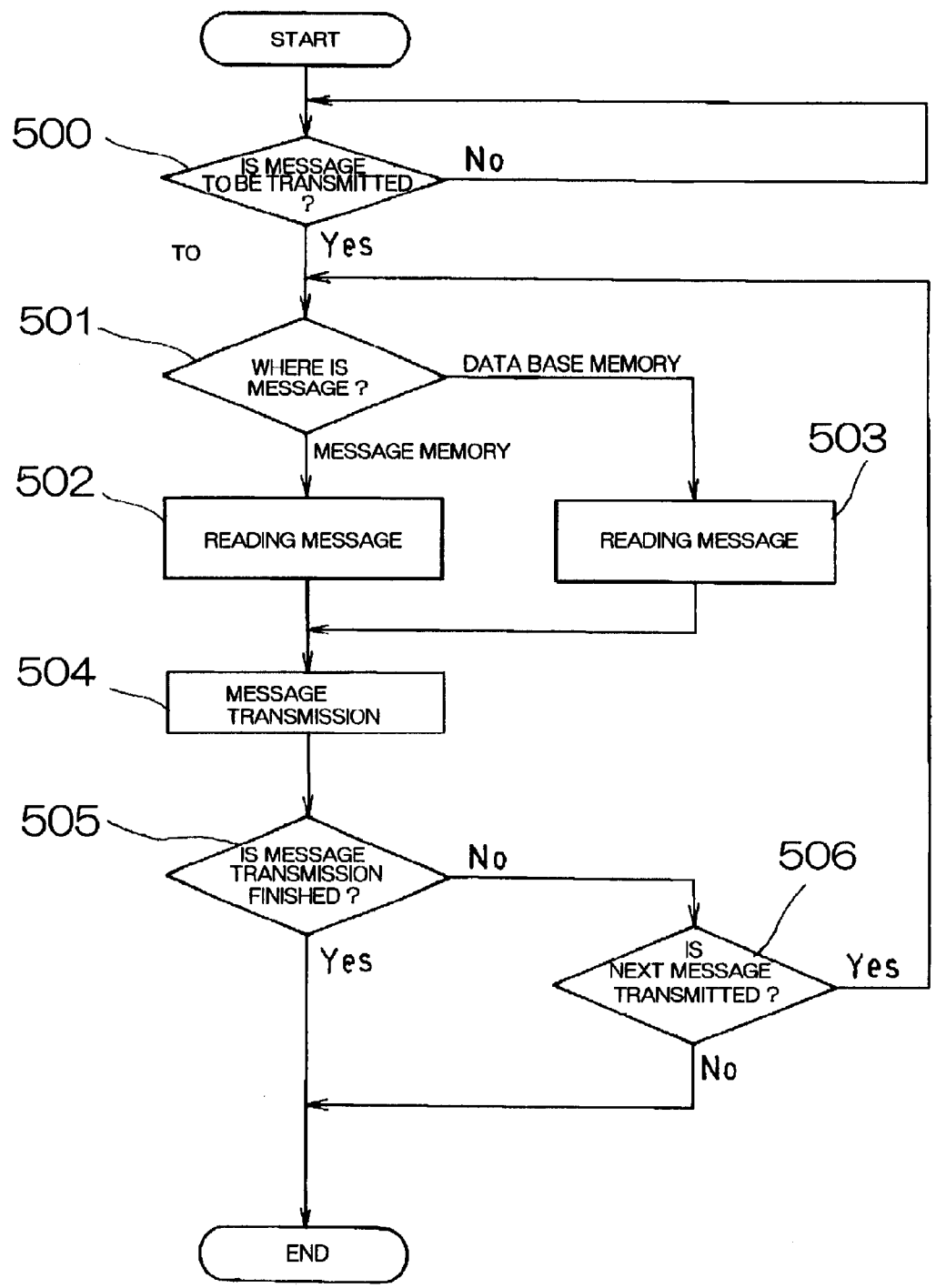
FIG. 14 is a flow chart showing an operation for transmitting a message in the fourth embodiment.

FIG. 14 is a flow chart showing an operation of transmitting a message in the radio-signal transceiver in accordance with the fourth embodiment.

The auxiliary controller 15 makes judgement as to whether a command to transmit a message is transmitted from the interface 13, in step 500. If the auxiliary controller 15 detects such a command (YES in step 500), the auxiliary controller 15 requests the main controller 14 to start reading a message. On receipt of the request from the auxiliary controller 15, the main controller 14 transmits a command to either the message memory 18 or the data base manager 20, instructing to read out a message in question.

The main controller 14 makes judgement as to where a message is read out of, in step 501. If a message is judged to be read out of the message memory 22 in step 501, the message memory manager 18 reads the message out of the message memory 22 in step 502. If a message is judged to be read out of the data base memory 21 in step 501, the data base manager 20 reads the message out of the data base memory 21 in step 503.

The thus read-out message is transmitted to the base station 2a through the antenna 11, in step 504. Then, it is judged as to message transmission is to be finished, in step 505. If message transmission is to be finished (YES in step 505), the message-printing operation is finished.

If message transmission is to be continued (NO in step 505), it is judged as to whether a next message is to be transmitted, in step 506. If a next message is transmitted (YES in step 506), the steps 501 to 505 are repeated.

When there occurs an error for some reason while a message is being transmitted, the radio-signal transceiver 3a may transmit a signal to the base station 2a which signal is indicative of a time zone in which a message has been transmitted. In response to the signal, the base station transmits a message again to the radio-signal transceiver 3a, and thus, the radio-signal transceiver 3a can properly have a message.

If a message is not an urgent one, the base station 2a may be designed to store such non-urgent messages, and transmit them to the radio-signal transceiver 3a when such non-urgent messages reach a predetermined amount. Thus, it is not necessary to keep a battery of the radio-signal transceiver 3a on, ensuring saving power consumption.

As an alternative, power consumption in a battery of the radio-signal transceiver 3a may be saved by employing intermittent receipt system in which a message is intermittently received. In such intermittent receipt system, a message is intermittently received only in a group to which the radio-signal transceiver belongs, by turning the radio-signal receiver 12 on or off. A use rate of a selective calling signal in the group may be varied in accordance with traffic of a message. The radio-signal receiver may be turned on or off through the use of a specific command.

A message may be transmitted at a plurality of times, or there may be adopted time division diversity in which single data is assigned to a plurality of time slots to thereby transmit a message.

Though the present invention is applied to a radio-signal transceiver in the above-mentioned first to fourth embodiments, the present invention may be applied to a cellular phone, a code-less telephone, personal handy telephone system (so-called PHS), mobile communication system to be used for an automobile or a ship, mobile computing, wireless LAN, wireless system in a local area, and navigation system using a satellite.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-345700 filed on Dec. 4, 1998 including specification, claims, drawings and summary is incorporated herein by reference in its entirety.

What is claimed is:

1. A radio-signal transceiver comprising:
   (a) an antenna;
   (b) a radio-signal receiver receiving a message having been received through said antenna, addressed to a calling number of said radio-signal transmitter;
   (c) a main controller controlling an operation of said radio-signal receiver;
   (d) an interface through which a command is input into said radio-signal receiver;
   (e) an auxiliary controller analyzing said command and transmitting a signal indicative of an operation represented by said command, to said main controller;
   (f) a display screen displaying said message; and
   (g) a message analyzer analyzing said message and extracting data to be registered,
   said auxiliary controller making judgment as to whether a received message is able to be registered, based on analysis made by said message analyzer, and registering a received message automatically or manually, if a received message is judged to be able to be registered.

2. The radio-signal transceiver as set forth in claim 1, further comprising:
   (h) a message memory storing a received message therein;
   (i) a data base manager managing data extracted by said message analyzer; and (j) a data base memory storing data transmitted from said data base manager, said main controller reading message out of said message memory, and storing the thus read-out message in said data base memory, on receipt of a command to register a received message, transmitted from said interface.

3. The radio-signal transceiver as set forth in claim 1, wherein said radio-signal receiver has capability of transmitting a message, said radio-signal receiver, on receipt of a command transmitted from said interface, reading a message out of said message memory and/or data base memory and transmitting the thus read out message to an external printer through said antenna to thereby print said message.

4. The radio-signal transceiver as set forth in claim 1, wherein said radio-signal receiver has capability of transmitting a message, said radio-signal receiver, if a received message contains an error, causing a base station to transmit the message thereto again.

5. A radio-signal transceiver comprising:

(a) an antenna;

(b) a radio-signal receiver receiving a message having been received through said antenna, addressed to a calling number of said radio-signal transmitter;

(c) a main controller controlling an operation of said radio-signal receiver;

(d) an interface through which a command is input into said radio-signal receiver;

(e) an auxiliary controller analyzing said command and transmitting a signal indicative of an operation represented by said command, to said main controller;

(f) a display screen displaying said message; and (g) a message analyzer analyzing said message and extracting data to be registered, said auxiliary controller making judgment as to whether a received message is able to be registered, based on analysis made by said message analyzer, and registering a received message automatically or manually, if a received message is judged to be able to be registered, said interface having a function of editing a message displayed on said display screen.

6. The radio-signal transceiver as set forth in claim 5, further comprising:

(h) a message memory storing a received message therein;

(i) a data base manager managing data extracted by said message analyzer; and (j) a data base memory storing data transmitted from said data base manager, said main controller reading message out of said message memory, and storing the thus read-out message in said data base memory, on receipt of a command to register a received message, transmitted from said interface, said interface reading message out of said message memory, and editing the thus read-out message.

7. The radio-signal transceiver as set forth in claim 5, further comprising:

(h) a message memory storing a received message therein;

(i) a data base manager managing data extracted by said message analyzer; and (j) a data base memory storing data transmitted from said data base manager, said interface reading message out of said message memory, and editing the thus read-out message.

8. The radio-signal transceiver as set forth in claim 5, wherein said radio-signal receiver has capability of transmitting a message, said radio-signal receiver, on receipt of a command transmitted from said interface, reading a message out of said message memory and/or data base memory and transmitting the thus read out message to an external printer through said antenna to thereby print said message.

9. The radio-signal transceiver as set forth in claim 5, wherein said radio-signal receiver has capability of transmitting a message, said radio-signal receiver, if a received message contains an error, causing a base station to transmit the message thereto again.

10. A method of controlling a radio-signal transceiver, comprising the steps of:

(a) receiving a message addressed to a calling number of said radio-signal transceiver;

(b) making judgment as to whether the thus received message is able to be registered;

(c) inputting a command as to whether said received message is to be registered automatically or manually; and (d) automatically or manually registering said received message based on said command, if said received message is judged to be able to be registered.

11. The method as set forth in claim 10, further comprising the steps of:

(e) storing said received message in a message memory; and (f) reading said received memory out of said message memory, and storing the thus read-out message into a data base.

12. The method as set forth in claim 10, further comprising the steps of:

(g) displaying said received message on a display screen; and (h) editing said received message on said display screen.

13. The method as set forth in claim 10, further comprising the steps of:

(i) reading a message out of said message memory and/or data base; and (j) transmitting the thus read-out message to an external printer to thereby print said message.

14. The method as set forth in claim 10, further comprising the step of causing a base station to transmit a message again, if said received message contains an error.

* * * * *